US006854224B2

(12) United States Patent
Thill et al.

(10) Patent No.: US 6,854,224 B2
(45) Date of Patent: Feb. 15, 2005

(54) LOADING DOCK WITH VERTICALLY MOVABLE SIDE PADS

(75) Inventors: Gregory J. Thill, Dubuque, IA (US); Timothy J. Schmidt, Dubuque, IA (US)

(73) Assignee: Rite - Hite Holding Corporation, Milwaukee, WI (US)

( * ) Notice: Subject to any disclaimer, the term of this patent is extended or adjusted under 35 U.S.C. 154(b) by 17 days.

(21) Appl. No.: 09/789,118

(22) Filed: Feb. 20, 2001

(65) Prior Publication Data

US 2002/0112418 A1 Aug. 22, 2002

(51) Int. Cl.[7] .............................................. E04H 14/00
(52) U.S. Cl. ...................................................... 52/173.2
(58) Field of Search .......................... 52/173.2; 49/504, 49/484.1, 498.1

(56) References Cited

U.S. PATENT DOCUMENTS

| | | | |
|---|---|---|---|
| 688,595 | A | 12/1901 | Coe |
| 1,008,491 | A | 11/1911 | Pruden |
| 2,565,393 | A | 8/1951 | Oswald |
| 2,627,912 | A | 2/1953 | Soppeland |
| 2,704,574 | A | 3/1955 | Etlar |
| 2,764,236 | A | 9/1956 | Dye |
| 2,892,463 | A | 6/1959 | Frommelt et al. |
| 3,095,886 | A | 7/1963 | Frommelt et al. |
| 3,181,205 | A | 5/1965 | Frommelt et al. |
| 3,195,953 | A | 7/1965 | Zacks |

(List continued on next page.)

FOREIGN PATENT DOCUMENTS

| | | |
|---|---|---|
| CH | 600117 | 6/1978 |
| CH | 685117 | 3/1995 |
| DE | 24 36 518 | 8/1975 |

(List continued on next page.)

OTHER PUBLICATIONS

Blueprine No. D802–0176; *Rain Diverter Curtain*; Rite–Hite Model No. WG402, dated Jul. 1, 1992.

Blueprint Nos. 692–0125 and 692–0126; *VHL Bottom Pads and VHL Bottom Pads Detail*; Frommelt Industries, Inc. dated Oct. 7, 1988.

Drawing No. 692–0029; *Adjustable Bottom Pad*; Frommelt Industries, Inc. dated Oct. 17, 1985; one page.

Drawing No. A204–0029 for "*C–Curtain—Split Corners*", Rite–Hite C–Curtain, dated May 27, 1994.

"*Dock Seal*", Installation Instructions, Kinnear—Division of Harsco Corp., 4 pages (1978).

"*Super Seal Dock Seals*" catalog 11160/SU; Super Seal Mfg. Ltd.; no date listed, but stamped rec'd by USPTO on Aug. 29, 1989.

*Primary Examiner*—Michael Safavi
(74) *Attorney, Agent, or Firm*—Marshall, Gerstein & Borun LLP

(57) ABSTRACT

A loading dock seal for around a doorway of a building includes a vertically movable side seal and a relatively fixed head seal that are adapted to seal against the rear of a truck. As the truck is loaded or unloaded of its cargo, the resulting weight change on the truck's suspension can cause the truck to raise and lower a few inches. To minimize the truck abrading the side seal, a movable coupling allows the side seal to move with the truck's vertical movement. In some embodiments, the coupling includes antifriction elements, such as rollers and bearing pads, which smoothen the motion of the side seal. Although the head seal is relatively fixed to ensure a positive seal against the face of the building, the head seal is designed to readily deform in response to the truck's vertical movement.

36 Claims, 4 Drawing Sheets

U.S. PATENT DOCUMENTS

| | | | |
|---|---|---|---|
| 3,203,002 A | 8/1965 | McGuire | |
| 3,216,433 A | 11/1965 | D'Azzo | |
| 3,230,675 A | 1/1966 | Frommelt et al. | |
| 3,352,314 A | 11/1967 | Frommelt et al. | |
| 3,375,625 A | * 4/1968 | Edkins et al. | 52/173.2 |
| 3,391,503 A | 7/1968 | O'Neal | |
| 3,403,489 A | 10/1968 | Frommelt et al. | |
| 3,440,673 A | 4/1969 | Kelley | |
| 3,493,984 A | 2/1970 | Reinhard | |
| 3,500,599 A | 3/1970 | Sciolino | |
| 3,538,655 A | 11/1970 | Frommelt et al. | |
| 3,557,508 A | 1/1971 | Frommelt et al. | |
| 3,570,033 A | 3/1971 | Hovestad et al. | |
| 3,613,324 A | 10/1971 | Conger | |
| 3,638,667 A | 2/1972 | Frommelt et al. | |
| 3,644,952 A | 2/1972 | Hatch | |
| 3,653,155 A | 4/1972 | de Brunyn, Jr. et al. | |
| 3,653,173 A | 4/1972 | Frommelt et al. | |
| 3,665,997 A | 5/1972 | Smith et al. | |
| 3,699,733 A | 10/1972 | Frommelt et al. | |
| 3,792,559 A | 2/1974 | Frommelt et al. | |
| 3,826,049 A | 7/1974 | Frommelt et al. | |
| 3,840,930 A | 10/1974 | Wanddell | |
| RE28,391 E | 4/1975 | Frommelt et al. | |
| 3,875,954 A | 4/1975 | Frommelt et al. | |
| 3,915,183 A | 10/1975 | Frommelt | |
| 3,934,380 A | 1/1976 | Frommelt et al. | |
| 3,935,684 A | 2/1976 | Frommelt et al. | |
| 3,939,614 A | 2/1976 | Frommelt et al. | |
| 3,994,103 A | 11/1976 | Ouellet | |
| 4,015,380 A | 4/1977 | Chalfant | |
| 4,062,157 A | 12/1977 | Potthoff | |
| 4,213,279 A | 7/1980 | Layne | |
| 4,262,458 A | 4/1981 | O'Neal | |
| 4,381,631 A | 5/1983 | Frommelt | |
| 4,420,849 A | 12/1983 | Alten | |
| 4,494,341 A | 1/1985 | Schwab | |
| 4,554,768 A | 11/1985 | Srajer | |
| 4,571,903 A | 2/1986 | Strassner | |
| 4,574,542 A | 3/1986 | Kleynjans | |
| 4,601,142 A | 7/1986 | Frommelt | |
| 4,638,612 A | 1/1987 | Bennett | |
| 4,679,364 A | 7/1987 | Fettig et al. | |
| 4,682,382 A | 7/1987 | Bennett | |
| 4,686,806 A | 8/1987 | Bennett | |
| 4,711,059 A | 12/1987 | Layne | |
| 4,718,207 A | 1/1988 | Frommelt | |
| 4,724,648 A | 2/1988 | Diepholder | |
| 4,744,121 A | 5/1988 | Swessel et al. | |
| 4,750,299 A | 6/1988 | Frommelt et al. | |
| 4,799,341 A | 1/1989 | Frommelt et al. | |
| 4,799,342 A | 1/1989 | Klevnjans | |
| 4,805,362 A | 2/1989 | Frommelt et al. | |
| 4,821,468 A | 4/1989 | Moore | |
| 4,825,607 A | 5/1989 | Frommelt et al. | |
| 4,873,800 A | 10/1989 | Frommelt et al. | |
| 4,873,801 A | * 10/1989 | Winters | 52/173.2 |
| 4,877,288 A | 10/1989 | Lee | |
| 5,007,211 A | 4/1991 | Ouellet | |
| 5,055,335 A | 10/1991 | Wicks | |
| 5,125,196 A | 6/1992 | Moody | |
| 5,185,977 A | 2/1993 | Brockman et al. | |
| 5,195,285 A | * 3/1993 | Alten | 52/173.2 |
| 5,282,342 A | 2/1994 | Brockman et al. | |
| 5,450,643 A | 9/1995 | Warner | |
| 5,452,489 A | 9/1995 | Gelder et al. | |
| 5,473,846 A | 12/1995 | Giuliani et al. | |
| 5,501,508 A | 3/1996 | Llewellyn | |
| 5,538,323 A | 7/1996 | Henkel | |
| 5,622,016 A | 4/1997 | Frommelt et al. | |
| 5,644,812 A | 7/1997 | Neufeldt et al. | |
| 5,651,155 A | 7/1997 | Hodges et al. | |
| 5,658,633 A | 8/1997 | Di Biase | |
| 5,669,665 A | 9/1997 | Nowak | |
| 5,675,945 A | 10/1997 | Giuliani et al. | |
| 5,775,044 A | 7/1998 | Styba et al. | |
| 5,881,414 A | 3/1999 | Alexander | |
| 5,953,868 A | 9/1999 | Giuliani et al. | |
| 5,996,291 A | 12/1999 | Styba et al. | |
| 6,006,389 A | 12/1999 | Alexander | |
| 6,070,283 A | 6/2000 | Hahn | |
| 6,205,721 B1 | 3/2001 | Ashelin et al. | |
| 6,233,885 B1 | 5/2001 | Hoffmann et al. | |
| 6,360,394 B1 | 3/2002 | Hahn | |

FOREIGN PATENT DOCUMENTS

| | | |
|---|---|---|
| DE | 28 00 128 | 7/1979 |
| DE | 31 30 657 | 2/1983 |
| DE | 296 00 207 | 4/1996 |
| DE | 196 12 135 | 10/1997 |
| DE | 297 16 877 | 2/1998 |
| DE | 298 04 117 | 6/1998 |
| EP | 0 040 388 | 11/1981 |
| EP | 0 205 648 | 12/1986 |
| EP | 0 379 634 | 8/1990 |
| EP | 0 602 501 | 6/1994 |
| EP | 0 641 731 | 3/1995 |
| FR | 2 686 913 | 8/1993 |
| GB | 4194 | of 1907 |
| GB | 1161537 | 8/1969 |
| WO | WO 02/70382 | 9/2002 |

* cited by examiner

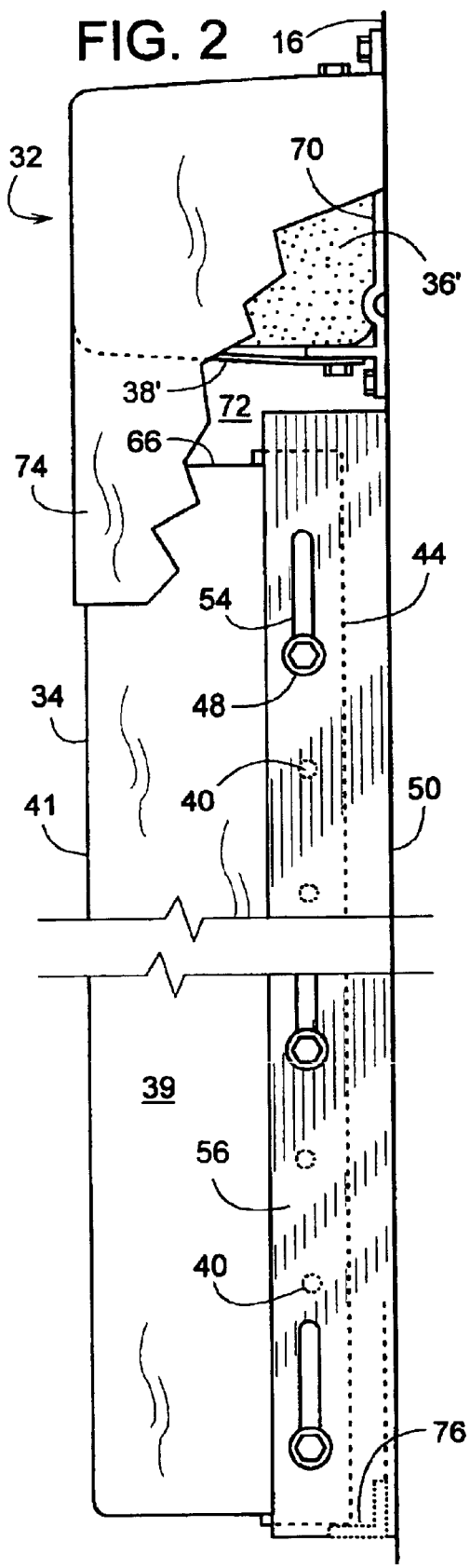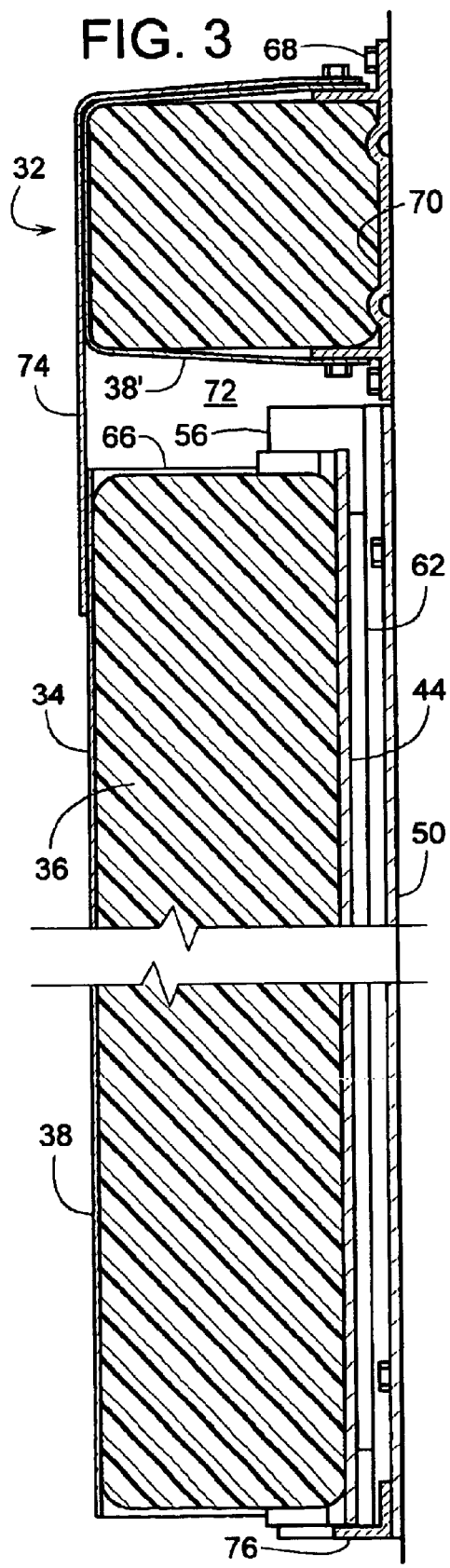

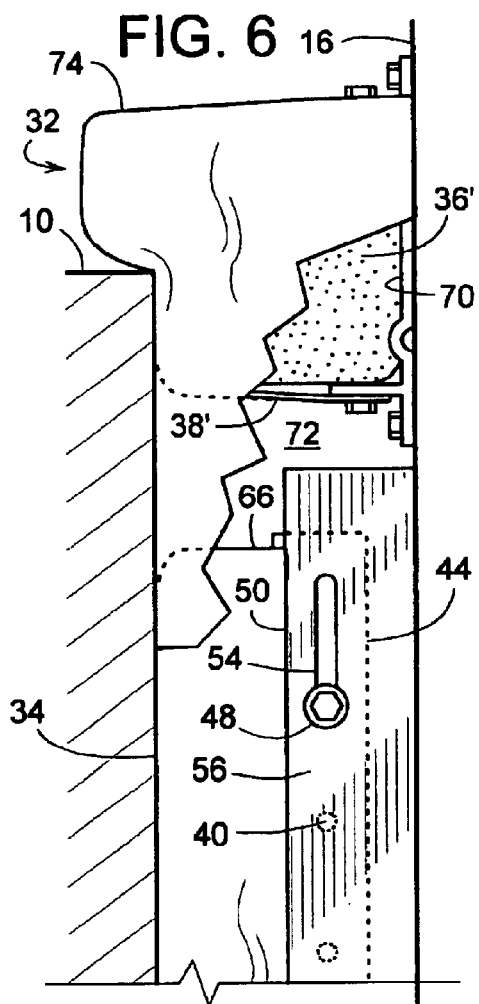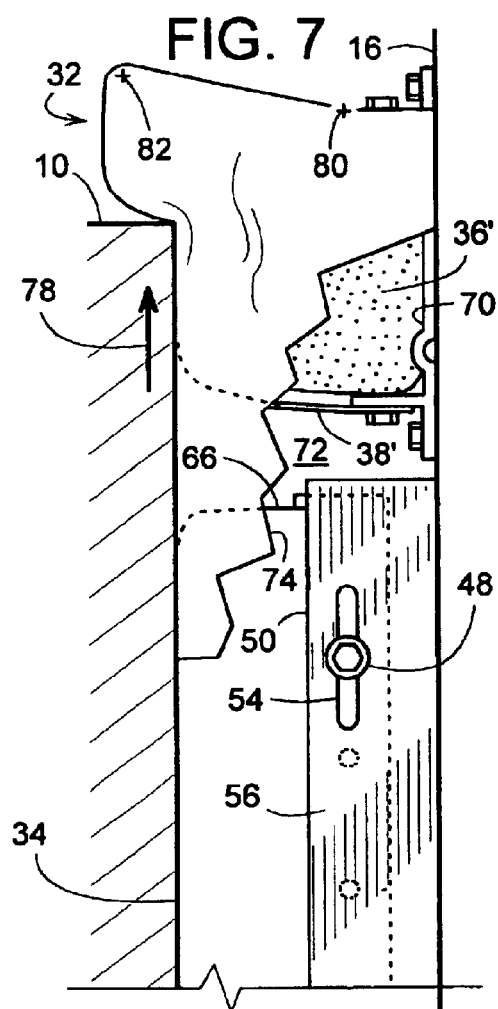

LOADING DOCK WITH VERTICALLY MOVABLE SIDE PADS

BACKGROUND OF THE INVENTION

1. Field of the Invention

The subject invention generally pertains to loading dock seals and more specifically one that is vertically movable.

2. Description of Related Art

When an exterior doorway of a building is used as a loading dock for vehicles, especially trucks, the perimeter of the doorway often includes a dock seal. Dock seals close off gaps that would otherwise exist between the exterior face of the building and the back end of the truck. This allows cargo from the rear of the truck to be loaded or unloaded while dockworkers and the cargo are protected from the weather. Usually two side seals run vertically along the lateral edges of the doorway, and a top or head seal runs horizontally along the doorway's upper edge.

A typical dock seal comprises a resiliently compressible foam core protected by a fabric outer cover. Sealing is provided by backing the truck up against the seal, so that the seal compressively conforms to the rear shape of the truck. The foam core provides the necessary compliance and resilience to repeatedly conform to the shape of various trucks, while the outer cover protects the foam core from dirt, water and wear.

The greatest wear on the outer cover often occurs during the loading and unloading of a truck parked against the dock seal. Adding or removing cargo and/or driving a forklift on and off the truck bed may cause the rear of the truck to rise or lower a few inches, due to the truck's suspension. The rear of the truck rubbing tightly against the pad can tear the pad's cover or at least shorten its life significantly.

To address this problem, various dock seals have been developed with some success. For example, the Kinnear division of the Harsco Corporation of Columbus, Ohio has provided a compressible dock seal that moves vertically with vertical movement of the truck, thus minimizing abrasive rubbing between the two. With the Kinnear design, two side seals and the head seal are mounted to the face of a building by way of a track that allows the seals to move vertically with the truck, as the truck is being loaded or unloaded. However, since the head curtain is fixed relative to the side seals (and thus moves with the side seals), it appears that a clearance between the head seal and the building wall needs to be sealed or sheltered in some way. Otherwise, rainwater running down the wall could possibly seep behind the head seal and leak into the building. Moreover, since the head seal is between the two side seals, rather than extending over the top of them, gaps may exist between the ends of the head seal and the two side seals. To seal such gaps, and to seal the clearance between the head seal and the wall, apparently an additional cover or curtain is installed to overhang and cover the head seal and both side seals.

U.S. Pat. No. 4,015,380 discloses another dock seal that moves in response to vertical movement of the back of a vehicle. Here, the side seals include a corrugated sealing surface that is able to collapse and fold in the direction of the vehicle's movement. However, much of the seal's vehicle-responsive movement is provided by shifting of the sealing surface itself. Thus, it appears that much of the abrasive wear would still be concentrated at the sealing surface.

Other dock seals having a vertically movable head seal are disclosed in U.S. Pat. Nos. 5,775,044; 4,494,341 and 3,230,675. In each of these examples, however, the side seals appear to be fixed relative to the building wall.

SUMMARY OF THE INVENTION

In order to provide a dock seal that moves with vertical movement of a vehicle pressed against the seal, a dock seal includes a side seal and a head seal, wherein movement of the side seal is provided by a movable coupling, and movement of the head seal is provide by its ability to readily deform.

In some embodiments, the head seal extends out over the upper ends of the side seals with a gap therebetween to allow the side seals to move vertically.

In some embodiments, a fabric curtain covers the gap between the head seal and the upper ends of the side seals.

In some embodiments, the side seals move vertically with the vehicle to avoid damaging the seal's fabric cover, as the vehicle presses deeply into a foam core of the seal.

In some embodiments, the movable coupling includes a roller to reduce friction within the coupling.

In some embodiments, the movable coupling includes a wear pad to reduce friction within the coupling.

In some embodiments, the movable coupling is made of a material that is tougher or more wear resistant than the seal's fabric cover.

In some embodiments, the vertically movable side seal is biased towards its lower travel limit to maximize the side seals range of upward travel from its standby position.

BRIEF DESCRIPTION OF THE DRAWINGS

FIG. 2 is a partial cut-away side view of the dock seal of FIG. 1.

FIG. 3 is a cross-sectional view taken along line 3—3 of FIG. 1.

FIG. 6 is similar to FIG. 2, but with a vehicle engaging the seal to place the seal in a sealing mode.

FIG. 7 is similar to FIG. 6, but showing the vehicle having risen from its position of FIG. 6.

DESCRIPTION OF THE PREFERRED EMBODIMENT

Figure 1:
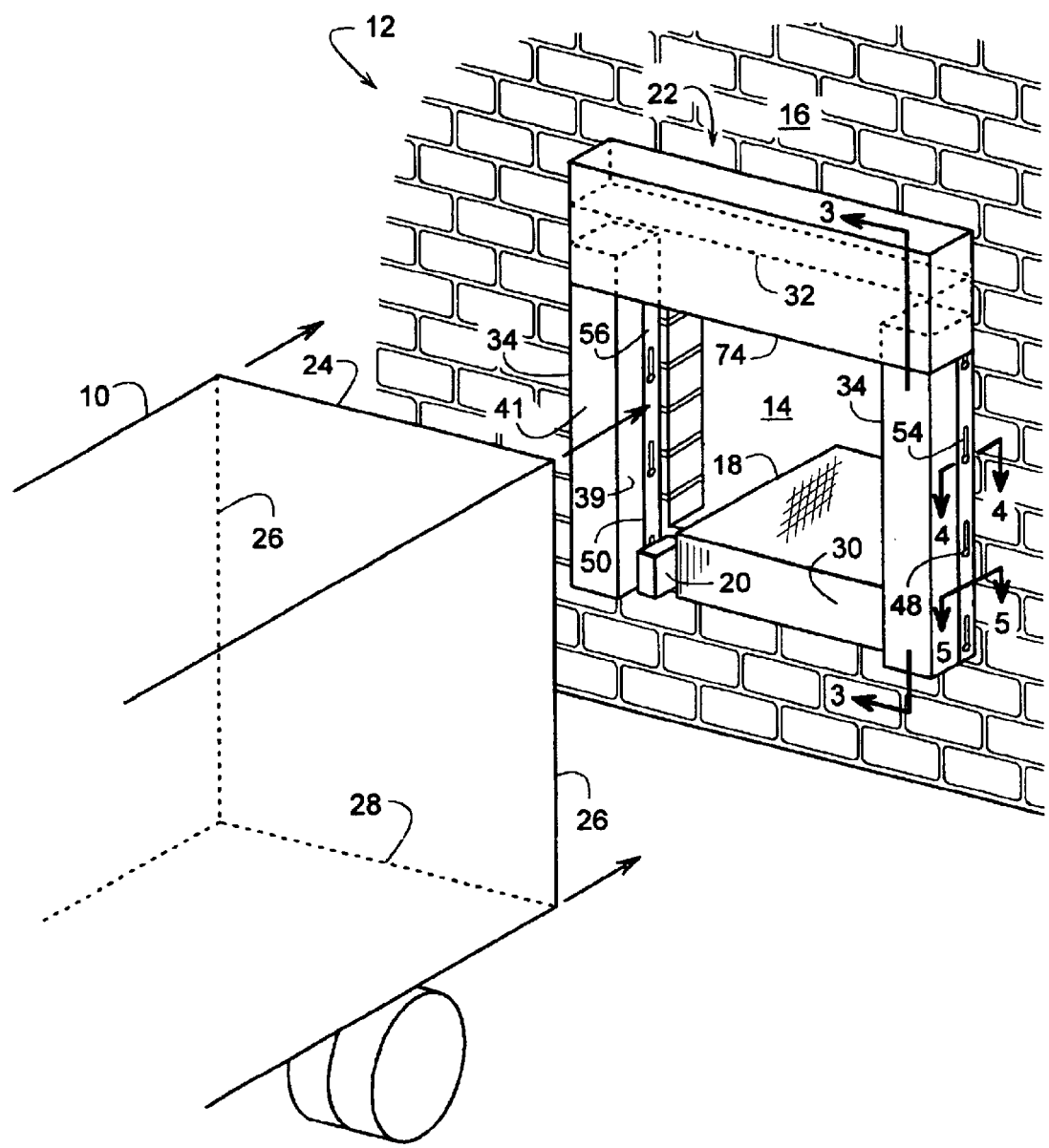
FIG. 1 is a perspective view of a vehicle approaching one embodiment of a dock seal in a standby mode.
Figure 4:
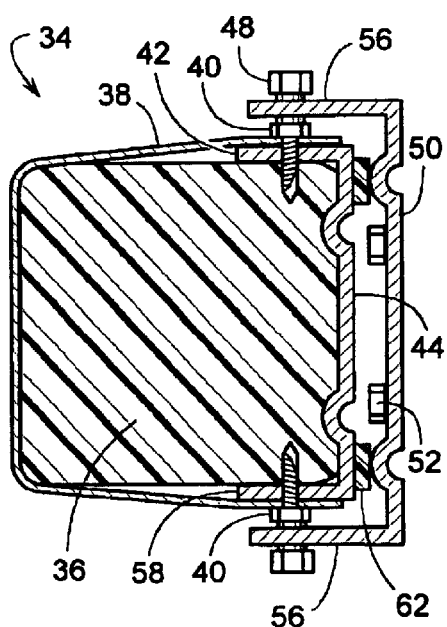
FIG. 4 is a cross-sectional view taken along line 4—4 of FIG. 1.
Figure 5:
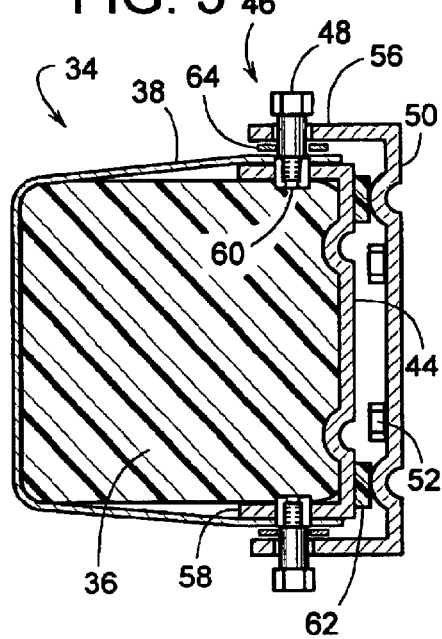
FIG. 5 is a cross-sectional view taken along line 5—5 of FIG. 1.

FIG. 1 shows a vehicle 10, such as a trailer of a truck, backing up to a loading dock 12. Loading dock 12 is basically a doorway 14 or an opening in a wall 16 of a building, and may be associated with a dock leveler, bumpers 20, and other items that facilitate loading and unloading of the vehicle's cargo. One such item in particular, which is the subject of this application, is a dock seal 22.

When vehicle 10 is backed against dock seal 22, seal 22 helps seal the air gap that might otherwise exist between the outer face of wall 16 and an upper 24 and lateral edges 26 of the rear of vehicle 10. Much of the gap between the doorway and a lower rear edge 28 of vehicle 10 can be blocked off by a conventional dock leveler 18 which usually has a retractable lip 30 that can extend outward to bridge the gap. However, the gap at the upper and lateral edges of vehicle 11 typically requires additional sealing, and the shape of the gap in these areas can be quite unpredictable. Therefore, in one exemplary embodiment, dock seal 22 includes a head seal 32 (upper-sealing member) and two side seals 34 (side-sealing member), with head seal 32 sealing along upper edge 24 of vehicle 10 and side seals 34 sealing along lateral edges 6.

Referring to FIGS. 2–5, side seal 34 includes a core 36 that provides the desired properties of resilience and compressibility. Compressibility allows seal 34 to conform to the contour of the vehicle's back surface to effectively seal against outside air, and resilience allows seal 34 to substantially recover its original decompressed shape. In one embodiment, core 36 consists of a resilient, compressible foamed polyurethane or foamed polyester, such as, for example, an L24 open-cell polyurethane foam provided by Leggett & Platt of Carthage, Mo. However, it should be appreciated by those skilled in the art that a wide variety of other synthetic or natural foams may also work well. Moreover, mechanical springs or bellows may also accomplish the desired functions otherwise provided by foam.

Since the inherent porosity of foam tends to absorb moisture, hold dirt, and make core 36 less wear resistant, a tough, flexible, water-resistant protective cover 38 covers the most exposed areas of core 36. One example such a cover would be a 3022_MFRLPC_DC7 material provided by the Seaman Corporation of Wooster, Ohio. Other examples of cover materials would include, but not be limited to, HYPALON, canvas duck, rubber impregnated fabric and coated nylon fabric. For some embodiments, cover 38 wraps around core 36, and self-tapping screws 40 fasten cover 38 to side flanges 42 of a backer 44 made of sheet metal or some other appropriate material. Although screws 40 are used in a preferred embodiment, cover 38 can be held in place using any appropriate fastener or means for attaching, such as hooks, screws that are not self-tapping, adhesive, touch-and-hold fastener (e.g., VELCRO), sewing, snaps, etc.

To minimize abrasion between cover 38 and the rear of vehicle 10, a movable coupling 46 attaches side seal 34 to wall 16, so that side seal 34 can move vertically with vehicle 10, as vehicle 10 is being loaded or unloaded of its cargo. Such a coupling can be provided by a variety of structures of which coupling 46 represents a currently preferred embodiment. In this example, coupling 46 includes a shoulder screw 48 that attaches backer 44 to a base plate 50, which in turn is fastened to wall 16 by way of anchor screws 52. Screws 48 extend through vertically elongated slots 54 in side flanges 56 of base plate 50 and screw into side flanges 58 of backer 44. In this case, each screw 40 actually screws into a rivet-nut 60, which is an internally threaded fastener that is pressed into flanges 58. A sliding fit between screws 48 and slots 54 allows backer 44 to move a few inches vertically relative to base plate 50. Thus, cover 38 and foam core 36 can also move a few inches vertically, as backer 44 carries these items. Although backer 44, screws 48 and base plate 50 are each made of metal, making one or more of these items of a different material is well within the scope of the invention.

To smoothen the sliding action between backer 44 and base plate 50, several things can be done. For example, an anti-friction wear pad, such as a wear strip 62 can be placed between backer 44 and base plate 50. Wear strip 62 can be made of UHMW (ultra high molecular weight polyethylene) or some other low friction, wear resistant material that is distinguishable from the material of backer 44 and/or base plate 50. In some cases, strip 62 can be adhesively attached to backer 44. To avoid friction and wear between flanges 56 and the adjacent portion of cover 38, the heads of screws 40 provide a standoff that help keep flanges 56 and cover 38 from rubbing against each other. Also, a washer 64 installed around screws 48 and situated between flanges 56 and 58 helps keep cover 38 and flanges 56 separated.

To seal along upper edge 24 of vehicle 10, head seal 32 runs horizontally above doorway 14 and extends over upper ends 66 of side seals 34. Similar to side seals 34, head seal 32 includes a resiliently compressible foam core 36' protected by a cover 38' that is held to a backer 70 by screws 68. Backer 70 is mounted to wall 16 just a few inches above ends 66 to provide a gap 72 that allows side seals 34 some vertical movement. A fabric cover 74, attached to head seal 32 and extending below the upper ends 66 of side seals 34, helps cover gap 72.

In operation, vehicle 10 begins backing toward dock seal 22, which is in a standby mode, as shown in FIGS. 1–3. In the standby mode, vehicle 10 has not yet engaged dock seal 22, and side seals 34 are at their lower limit of travel. In this case, the lower limit is determined by backer 44 resting atop an angle 76 that is fixed relative to base plate 50. However, it should be appreciated by those skilled in the art that a wide variety of other stops could be used to limit the lower travel of side seals 34. For example, screw 48 reaching the lower end of slot 54 could also determine the lower limit of travel for side seals 34.

As vehicle 10 presses into side seals 34 and head seal 32, dock seal 22 compresses into its sealing mode (i.e., engaging vehicle 10), as shown in FIG. 6. Subsequent upper movement 78 of vehicle 10 can raise side seals 34 and distort head seal 32, while dock seal 22 remains in its sealing mode. In FIG. 7, side seals 34 are shown to have risen about halfway between their lower limit of FIG. 6 and an upper limit. The upper travel limit of side seals 34 can be provided in a number of ways including, but not limited to, screws 48 reaching the end of their upper travel within slots 50, or upper end 66 of side seals 34 abutting the underside of head seal 32.

Having backer 70 of head seal 32 fixed relative to wall 16 simplifies the design of dock seal 22 by reducing the number of moving parts that might otherwise be required. Moreover, such a design can make it easier to seal the area between backer 70 and the face of wall 16, as the sealed area does not have to allow for any sliding motion between backer 70 and wall 16. Nonetheless, the distortion of head seal 32 accommodates ample movement of vehicle 10 without excessive force, because cover 38' can readily bend along various horizontal axes (e.g., lines 80 and 82) upon moving from its position of FIG. 6 to that of FIG. 7. The distortional movement of the cross-section shape of cover 38' as viewed in FIG. 6 is comparable to the freedom of movement found in a typical four-bar linkage. In contrast, the shape of cover 38 on side seals 34 provides large generally planar surfaces 39 (e.g., the surface of cover 38 that is viewable in FIG. 2) that resist vertical deflection of a sealing face 41 of side seal 34 relative to backer 44. Thus, firmly affixing head seal 32 to wall 16 while providing side seals 34 with a movable coupling 46 provides a dock seal 22 with desirable sealing and wear resistant features.

Figure 8:
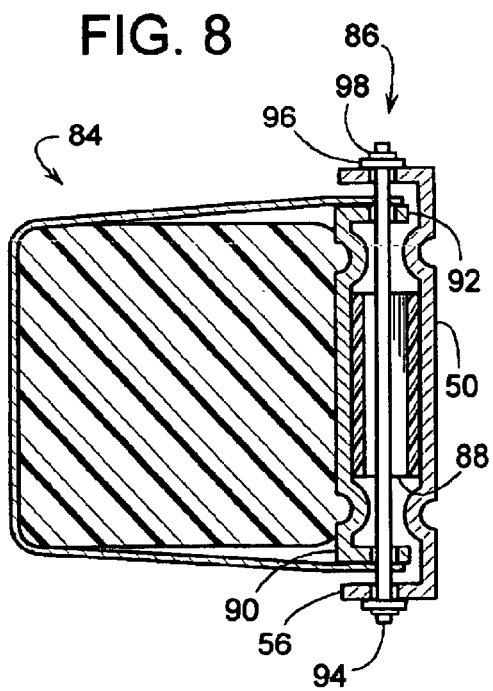
FIG. 8 is similar to FIG. 5, but of another embodiment.

In another embodiment, shown in FIG. 8, a side seal 84 includes a movable coupling 86 with a roller 88 for reducing friction. Roller 88 represents any rolling element including, but not limited to solid round rods, balls, and cylinders. A base plate 50, is the same as the one used for side seals 34; however, seal 84 has an inverted backer 90 with flanges 92 that are pinned to flanges 56 by way of rod 94. In some embodiments, rod 94 feeds through the center of roller 88 (having a tubular shape), to maintain roller 88 in rolling contact with backer 90 and base plate 50. Washers 96 and a conventional fastener 98 (e.g., E-clips, C-clips, cotter pins, nuts, etc.) can be used to help hold rod 94 within slots 54 of flanges 56 and the holes of flanges 92.

Figure 9:
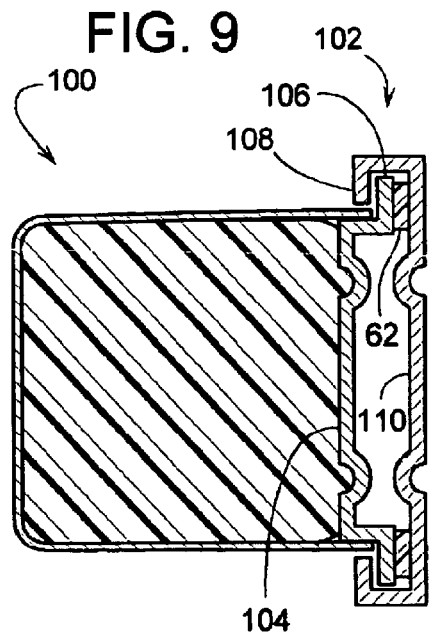
FIG. 9 is similar to FIG. 5, but of yet another embodiment.

In yet another embodiment, shown in FIG. 9, a side seal 100 provides a movable coupling 102 by having a backer 104 with flanges 106 that are captured within flanges 108 of a base plate 110. A sliding fit between flanges 106 and 108 allows side seal 100 to move vertically with vehicle 10. To reduce sliding friction, antifriction element 62 can be inserted between flanges 106 and base plate 110.

Although the invention is described with respect to a preferred embodiment, modifications thereto will be apparent to those skilled in the art. Therefore, the scope of the invention is to be determined by reference to the claims, which follow.

We claim:

1. A dock seal disposed adjacent a doorway of a wall and having a standby mode and a sealing mode, wherein a vehicle engaging the dock seal places the dock seal in the sealing mode and the vehicle disengaging the dock seal allows the dock seal to return to the standby mode, comprising:

a head seal having a compressible core and being horizontally elongated;

a side seal being vertically elongated, the side seal having a sealing surface and an inner surface adjacent the wall;

a linearly moveable coupling connected to the side seal between the sealing surface and the inner surface and adapted to couple the side seal to the wall to provide the side seal with a vertical range of motion having a lower limit and an upper limit, wherein the side seal is appreciably closer to the lower limit than to the upper limit when the dock seal is in the standby mode; and wherein the head seal extends over the side seal.

2. The dock seal of claim 1, wherein the head seal and the side seal define a gap therebetween that allows the side seal to be vertically movable.

3. The dock seal of claim 2, further comprising a flexible head curtain that drapes downward to bridge the gap between the side seal and the head seal.

4. The dock seal of claim 1, wherein the side seal includes a form interior.

5. The dock seal of claim 1, wherein the movable coupling includes a first member substantially fixed to the side seal, a second member adapted to be substantially fixed to the wall, and a connector that holds the first member to the second member while allowing relative sliding motion therebetween.

6. The dock seal of claim 5, wherein the connector includes a roller.

7. The dock seal of claim 5, further comprising a wear pad interposed between the first member and the second member, wherein the wear pad is of a first material that is distinguishable from a second material found in at least one of the first member and the second member.

8. The dock seal of claim 7, further comprising an adhesive that bonds the wear pad to at least one of the first member and the second member.

9. The dock seal of claim 7, wherein the first material is a polymer.

10. The dock seal of claim 5, wherein the connector is threaded.

11. The dock seal of claim 5, wherein at least one of the first member and the second member defines a slot through which the connector extends, such that relative sliding motion between the connector and the slot allows the side seal to move vertically relative to the wall.

12. The dock seal of claim 1, wherein the side seal is substantially at the lower limit when the dock seal is in the standby mode.

13. A dock seal disposed adjacent a doorway of a wall and having a standby mode and a sealing mode, wherein a vehicle engaging the dock seal places the dock seal in the sealing mode and the vehicle disengaging the dock seal allows the dock seal to return to the standby mode, comprising:

a head seal having a compressible core and being horizontally elongated;

a side seal being vertically elongated, the side seal having a sealing surface and an inner surface adjacent the wall, wherein the head seal extends over the side seal; and a linearly moveable coupling connected to the side seal between the sealing surface and the inner surface and adapted to couple the side seal to the wall to provide the side seal with a vertical range of motion having a lower limit, wherein the side seal in substantially at the lower limit when the dock seal is in the standby mode.

14. The dock seal of claim 13, wherein the head seal and the side seal define a gap therebetween that allows the side seal to be vertically movable.

15. The dock seal of 14, further comprising a flexible head curtain that drapes downward to bridge the gab between the side seal and the head seal.

16. The dock seal of claim 13, wherein the side seal includes a foam interior.

17. The dock seal of claim 13, wherein the movable coupling includes a first member substantially fixed to the side seal, a second member adapted to be substantially fixed to the wall, and a connector that holds the first member to the second member while allowing relative sliding motion therebetween.

18. The dock seal of claim 17, wherein the connector includes a roller.

19. The dock seal of claim 17, further comprising a wear pad interposed between the first member and the second member, wherein the wear pad is of a first material that is distinguishable from a second material found in at least one of the first member and the second member.

20. The dock seal of claim 19, further comprising an adhesive that bonds the wear pad to at least one of the first member and the second member.

21. The dock seal of claim 19, wherein the first material is a polymer.

22. The dock seal of claim 17, wherein the connector is threaded.

23. The dock seal of claim 17, wherein at least one of the first member and the second member defines a slot through which the connector extends, such that relative sliding motion between the connector and the slot allows the side seal to move vertically relative to the wall.

24. A dock seal disposed adjacent a doorway of a wall and being adapted to seal against a vehicle, comprising:

a head seal having a compressible core and being horizontally elongated;

a side seal being vertically elongated and extending below the head seal, the side seal having a sealing surface and an inner surface adjacent the wall, wherein the head seal extends over the side seal; and a linearly movable coupling connected to the side seal between the sealing surface and the inner surface and adapted to couple the side seal to the wall to render the side seal vertically movable relative to both the wall and the head seal.

25. The dock seal of claim 24, wherein the head seal and the side seal define a gap therebetween that allows the side seal to be vertically movable.

26. The dock seal of claim 25, further comprising a flexible head curtain that drapes downward to bridge the gap between the side seal and the head seal.

27. The dock seal of claim 24, wherein the side seal includes a foam interior.

28. The dock seal of claim 24, wherein the movable coupling includes a first member substantially fixed to the side seal, a second member adapted to be substantially fixed to the wall, and a connector that holds the first member to the second member while allowing relative sliding motion therebetween.

29. The dock seal of claim 28, wherein the connector includes a roller.

30. The dock seal of claim 28, further comprising a wear pad interposed between the first member and the second member, wherein the wear pad is of a first material that is distinguishable from a second material found in at least one of the first member and the second member.

31. The dock seal of claim 30, further comprising an adhesive that bonds the wear pad to at least one of the first member and the second member.

32. The dock seal of claim 30, wherein the first material is a polymer.

33. The dock seal of claim 28, wherein the connector is threaded.

34. The dock seal of claim 28, wherein at least one of the first member and the second member defines a slot through which the connector extends, such that relative sliding motion between the connector and the slot allows the side seal to move vertically relative to the wall.

35. The dock seal of claim 24, wherein the vehicle engaging the side seal places the dock seal in a sealing mode and the vehicle disengaging the side seal allows the dock seal to return to a standby mode, and the side seal is movable over a vertical range of motion having a lower limit with the side seal being substantially at the lower limit when the dock seal is in the standby mode.

36. The dock seal of claim 24, wherein the vehicle engaging the side seal places the dock seal in a sealing mode and the vehicle disengaging the side seal allows the dock seal to return to a standby mode, and the side seal is moveable over a vertical range of motion having a lower limit and an upper limit, wherein the side seal is appreciably closer to the lower limit than to the upper limit when the dock seal is in the standby mode.

* * * * *